United States Patent [19]
Takeuchi et al.

[11] Patent Number: 5,907,563
[45] Date of Patent: May 25, 1999

[54] ERROR CONTROL METHOD AND APPARATUS FOR WIRELESS DATA COMMUNICATION

[75] Inventors: Yoshio Takeuchi; Yoshihiko Ito, both of Saitama; Akira Yamaguchi, Tokyo, all of Japan

[73] Assignee: Kokusai Denshin Denwa Co. Ltd., Tokyo, Japan

[21] Appl. No.: 08/810,772

[22] Filed: Mar. 5, 1997

[30] Foreign Application Priority Data

Mar. 7, 1996 [JP] Japan .................................. 8-078157

[51] Int. Cl.⁶ ............................. H04L 1/16; H04L 1/20; H03M 13/00; H03M 13/22

[52] U.S. Cl. ............................................... 371/35; 371/41

[58] Field of Search ......................................... 371/41, 35

[56] References Cited

U.S. PATENT DOCUMENTS 4,701,923  10/1987  Fukasawa et al. .......................... 371/41
4,901,319  2/1990  Ross ............................................ 371/41

OTHER PUBLICATIONS

Rice et al., "Adaptive Error Control For Slowly Varying Channels", IEEE Trans. on Communications, vol. 42, No. 2/3/4, Feb./Mar./Apr. 1994, pp. 917–926, Feb. 1994.

Primary Examiner—Stephen M. Baker
Attorney, Agent, or Firm—Nikaido, Marmelstein, Murray & Oram LLP

[57] ABSTRACT

An error control method for wireless data transmission over a digital mobile communication system includes a step of obtaining, during data communication, statistical information including transmission error information at a receiving side, a step of determining an error control strategy and/or a value of at least one parameter of the error control strategy which are/is optimum for transmission path conditions at that time, based upon the obtained statistical information, and a step of using the determined error control strategy and/or the at least one parameter for the error control during data communication.

32 Claims, 12 Drawing Sheets

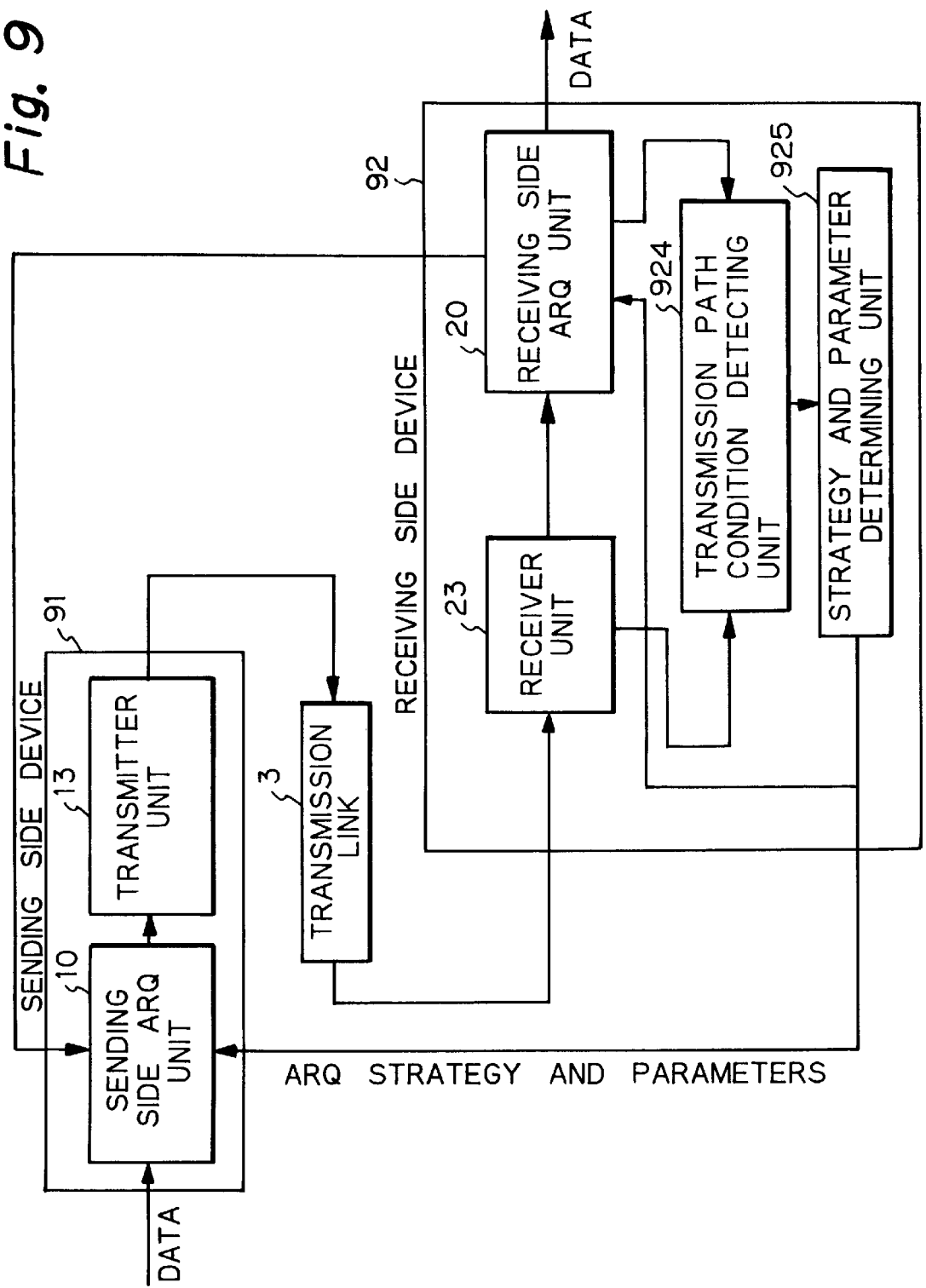

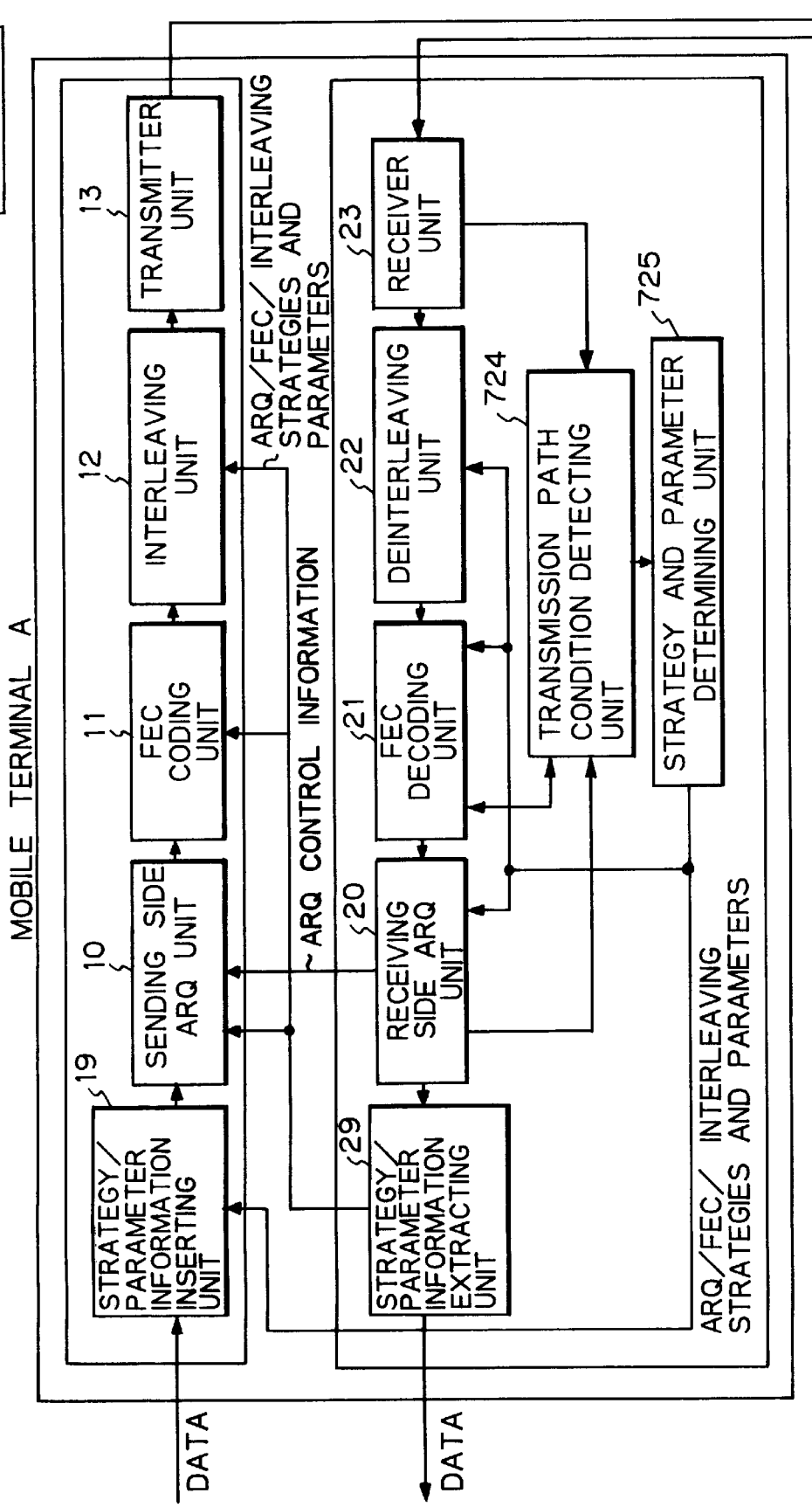

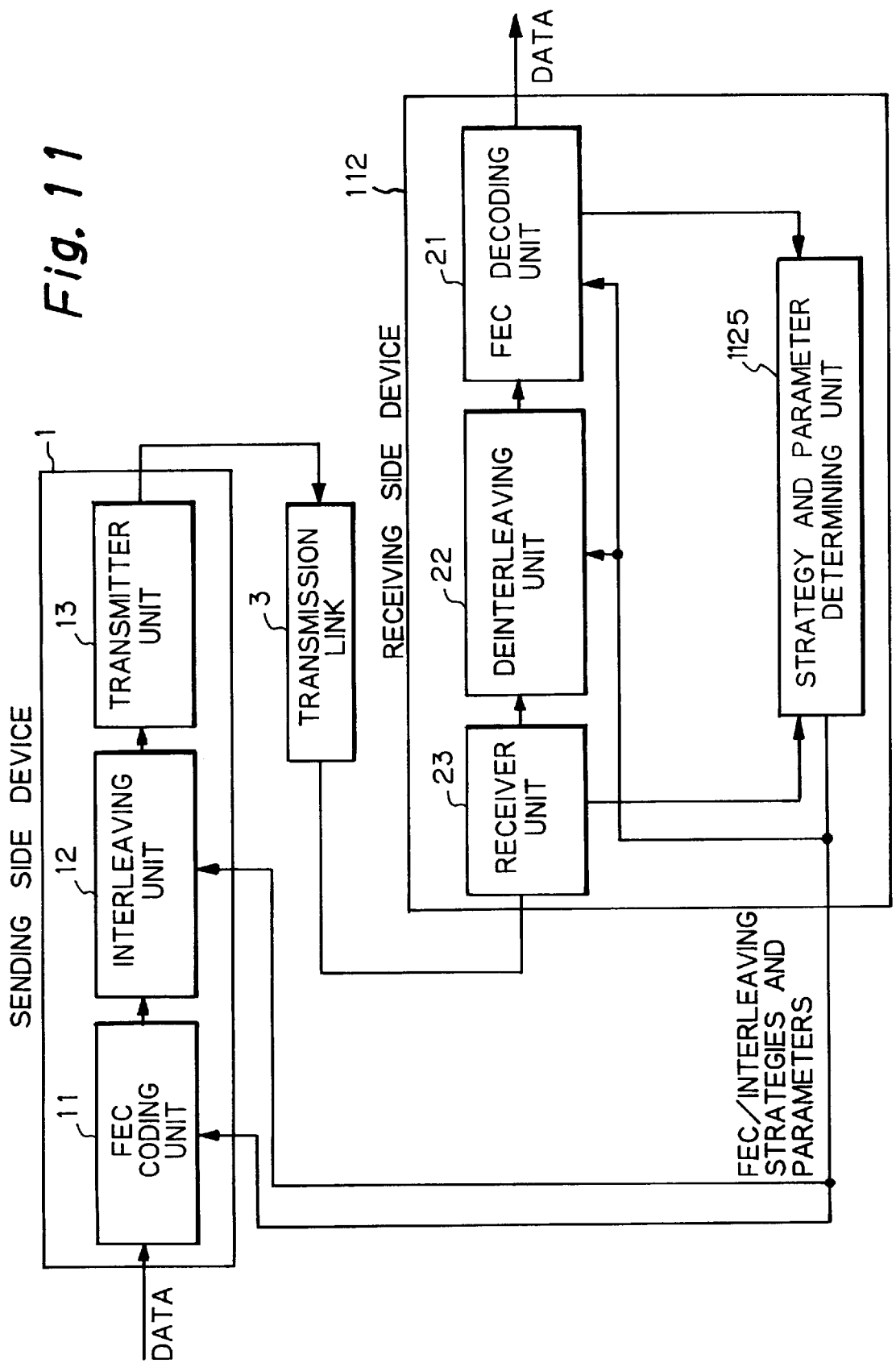

ERROR CONTROL METHOD AND APPARATUS FOR WIRELESS DATA COMMUNICATION

BACKGROUND OF THE INVENTION

1. Field of the Invention

The present invention relates to an error control method and apparatus for wireless data communication, particularly to an error control method and apparatus for wireless data transmission over a digital mobile communication system such as a PHS (Personal Handy phone System), various digital mobile/car phone systems, or a digital private wireless LAN (Local Area Network) system.

2. Description of the Related Art

Recently, data transmissions via mobile terminals of a mobile communication system have been popular in practice with the spread of personal computer communications and internet access. These wireless data communications have been utilized not only for private use, but also for commercial use.

In general, in the radio link or radio frequency communications environment, transmission path conditions will greatly vary due to the special characteristics of radio propagation, such as fading. Therefore, most of the digital mobile communication systems adopt at least one error control strategy such as, for example, the FEC (Forward Error Correction) strategy, or the ARQ (Automatic Repeat Request) strategy, so as to reduce bit errors which may occur during passage through the radio link.

In the PDC (Personal Digital Cellular) system, which is one of the Japanese digital mobile phone systems, the data communication of 2400 bit/s adopts the FEC strategy using BCH (Bose Chaudhuri Hocquenghem) code and the data communication of 9600 bit/s adopts the ARQ strategy with a combination of Go-Back-N and Selective Repeat protocols. In other mobile communication systems, the FEC strategy, the ARQ strategy or the FEC/ARQ hybrid strategy may be adopted for data communication.

According to the conventional data transmission over mobile communication systems, the error control strategy is not changed and its parameters are also fixed while the communication link is kept in connection. For example, in the above-mentioned data transmission of 2400 bit/s over the PDC system, the BCH code length is fixed to 15 bits, the information length is fixed to 4 bits, and the depth of the associated interleaving is fixed to 73 while the connection is kept. Also, in 9600 bit/s data communication, both the frame length and the modulo number for ARQ are fixed to certain values during the connection.

However, since the transmission path conditions will always vary in the mobile radio link environment, the unchanged error control strategy and fixed parameters thereof will introduce a number of problems, as will be discussed below.

The error control strategy and its parameters are usually designed so that bit errors can be reduced even when the transmission path conditions are somewhat poor. Therefore, when the conditions are relatively good, it is not necessary to execute such error control. In other words, no bit errors will occur without executing such error control. In such conditions, it is preferable to increase the amount of information which can be transmitted per unit of time rather than executing such error control. For example, in the above-mentioned data transmission of 2400 bit/s over the PDC system, the maximum transmission efficiency can be obtained if all bits are used for data transmission under good transmission path conditions. However, only 4 bits in the 15 bits of the BCH code can be utilized for data transmission causing a very low transmission efficiency of 4/15. Similar to this, in the data transmission of 9600 bit/s over the PDC system, 48 bits are utilized for the ARQ control information whereas 176 bits are used for data transmission, also causing a low transmission efficiency of 176/224.

Conversely, when the transmission path conditions become worse than the conditions estimated in designing the error control method and its parameters, high transmission performance cannot be maintained by means of the designed error control method and the parameters. As a result, bit errors may occur in the data transmitted to the user, the transmission delay may exceed the maximum permissible limit, or the throughput may be lowered. In an extreme case, no data transmission is possible, causing the transmission link to be disconnected.

SUMMARY OF THE INVENTION

It is therefore an object of the present invention to provide an error control method and apparatus for wireless data transmission over a digital mobile communication system, whereby errors can be adaptively controlled by using an optimum error control strategy and/or parameters which are changeable depending upon the variation of transmission path conditions.

According to the present invention, an error control method for wireless data transmission over a digital mobile communication system includes a step of obtaining, during data communication, statistical information including transmission error information at a receiving side, a step of determining an error control strategy and/or a value of at least one parameter of the error control strategy which are/is optimum for transmission path conditions at that time, based upon the obtained statistical information, and a step of using the determined error control strategy and/or the at least one parameter for the error control during data communication.

During data transmission, the statistical information including transmission error information is obtained, and then an optimum error control strategy and/or its parameters for transmission path condition at that time are determined in accordance with the obtained statistical information. Thus, errors can be adaptively controlled by using an optimum error control strategy and/or parameters which are changeable depending upon the variation of transmission path conditions. Namely, when the transmission path conditions are relatively good, the transmission efficiency (throughput) can be increased, whereas when the conditions become somewhat poor, the transmission performance can be maintained or improved.

Accordingly, by adopting the error control method and apparatus of the present invention to a mobile terminal, stable data communication can be achieved even when the mobile terminal location is far from a base station and therefore its environment is extremely poor with very low mean received signal level and with significant fading. Also, stable data transmission can be attained even when the mobile terminal is moving such that the transmission path conditions are greatly varying.

It is preferred that the determining step includes a first selection step of selecting values of condition parameters which represent conditions of a wireless transmission link, based upon the obtained statistical information, by reference to a preliminarily determined relation between the statistical information and the condition parameter values, and a step of determining the error control strategy and/or the at least one parameter of the error control strategy based upon the selected condition parameter values.

In this case, the determining step preferably includes a second selection step of selecting an error control strategy and/or at least one parameter of the error control strategy which are/is optimum for transmission path conditions at that time, based upon the selected condition parameter values, by reference to a preliminarily determined relation between the condition parameter values and the error control strategy and/or the at least one parameter of the error control strategy.

It is also preferred that the determining step includes a step of selecting an error control strategy and/or at least one parameter of the error control strategy which are optimum for transmission path conditions at that time, based upon the obtained statistical information, by reference to a preliminarily determined relation between the statistical information and the error control strategy and/or the at least one parameter of the error control strategy.

Furthermore, the invention is an error control apparatus for wireless data transmission over a digital mobile communication system, which includes a statistical information extraction unit for obtaining, during data communication, statistical information including transmission error information at a receiving side, a determination unit for determining an error control strategy and/or a value of at least one parameter of the error control strategy which are/is optimum for transmission path conditions at that time, based upon the obtained statistical information, and a unit for using the determined error control strategy and/or the at least one parameter for the error control during data communication.

It is preferred that the determination unit includes a first memory unit for storing a preliminarily determined relation between the statistical information and values of condition parameters which represent conditions of a wireless transmission link, a first selection unit for selecting condition parameter values based upon the obtained statistical information, by reference to the relation stored in the first memory unit, and a unit for determining the error control strategy and/or the at least one parameter of the error control strategy based upon the selected condition parameter values.

Preferably, the determination unit includes a second memory unit for storing a preliminarily determined relation between the condition parameter values and the error control strategy and/or the at least one parameter of the error control strategy, and a second selection unit for selecting an error control strategy and/or at least one parameter of the error control strategy which are/is optimum for transmission path conditions at that time, based upon the selected condition parameter values, by reference to the relation stored in the second memory unit.

It is also preferred that the determination unit includes a memory unit for storing a preliminarily determined relation between the statistical information and the error control strategy and/or the at least one parameter of the error control strategy, and a unit for selecting an error control strategy and/or at least one parameter of the error control strategy which are/is optimum for transmission path conditions at that time, based upon the obtained statistical information, by reference to the relation stored in the memory unit.

Preferably, the condition parameters include at least one of a fading rate, a fading depth, a ratio of mean received signal level to mean received noise level and a delay spread in the wireless transmission link.

Preferably, the statistical information includes at least one of a received signal level, a received noise level, information of corrected bit/symbol error and information indicating uncorrectable error.

It is also preferred that the statistical information further includes at least one of a number of errors occurred per a predetermined period of time, a fluctuation of the number of error indications per a predetermined period of time, a number of uncorrectable errors per a predetermined period of time, a burst error length, a burst error interval, a mean received signal level per a predetermined period of time, a fluctuating width of the received signal level per a predetermined period of time, a fluctuating period of the received signal level, and a mean noise level per a predetermined period of time.

The error control strategy may include a FEC strategy. FEC codes used in the FEC strategy may be Reed Solomon codes.

The error control strategy may include an interleaving strategy and/or an ARQ strategy.

According to the present invention, a data transmission system provided with a sending side device and a receiving side device which have at least one pair of the above-mentioned error control apparatuses, and a bidirectional transmission link for connecting the sending side device and the receiving side device is provided.

BRIEF DESCRIPTION OF THE DRAWINGS

Further objects and advantages of the present invention, as well as a detailed explanation thereof, will be apparent from the following description of the preferred embodiments of the invention as illustrated in the accompanying drawings, wherein:

FIG. 9 is a block diagram schematically illustrating another embodiment of an error control system for data transmission over a digital mobile communication system, according to the present invention;

FIGS. 10A and 10B together form FIG. 10, and illustrates a block diagram schematically illustrating a further embodiment of an error control system for data transmission over a digital mobile communication system, according to the present invention; and FIG. 11 is a block diagram schematically illustrating a further embodiment of an error control system for data transmission over a digital mobile communication system, according to the present invention.

DESCRIPTION OF THE PREFERRED EMBODIMENTS

Figure 1:
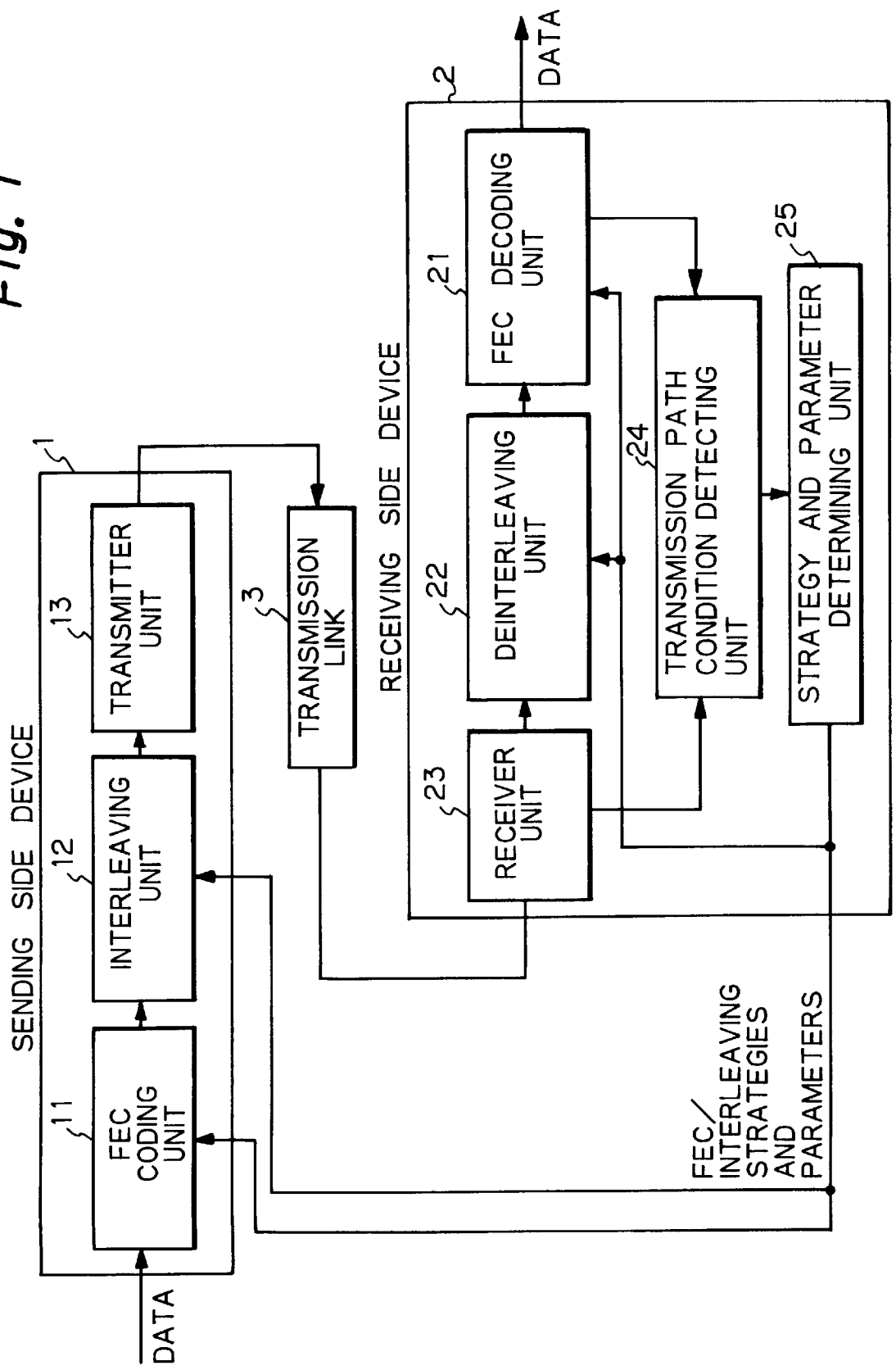
FIG. 1 is a block diagram schematically illustrating a preferred embodiment of an error control system for data transmission over a digital mobile communication system, according to the present invention.

As will be apparent from FIG. 1, the error control system of this embodiment is constituted by a sending side device 1 and a receiving side device 2 connected to each other by a transmission link 3 which includes a radio path.

The sending side device 1 has FEC coding unit 11, an interleaving unit 12 and a transmitter unit 13, whereas the receiving side device 2 has a receiver unit 23, a deinterleaving unit 22, FEC decoding unit 21, a transmission path condition detecting unit 24 and a strategy and parameter determining unit 25.

The FEC coding unit 11 in the sending side device 1 codes the input data in accordance with the FEC strategy. In this coding process, either block codes such as BCH codes or RS (Reed Solomon) codes, or convolutional codes, are used as the FEC codes. As for parameters in the block code FEC strategy, there are, for example, a generator polynomial (generator matrix), a block length, an information length in a block (or coding rate) and the number of correctable errors in a block. As for parameters in the convolutional code FEC strategy, there are, for example, a constraint length (generator polynomial), a coding rate, and a truncated path length at the Viterbi decoding. In this embodiment, the FEC strategy and at least one of these parameters can be changed in accordance with variation of the transmission path conditions, during data communication.

The FEC coding unit 11 is followed by the interleaving unit 12 for interleaving the FEC coded data. Since enough correction against possible burst errors cannot be expected in certain types of the FEC strategy, errors occurring on the transmission path are randomized by this interleaving and then the errors are corrected by using the FEC strategy.

Figure 2:
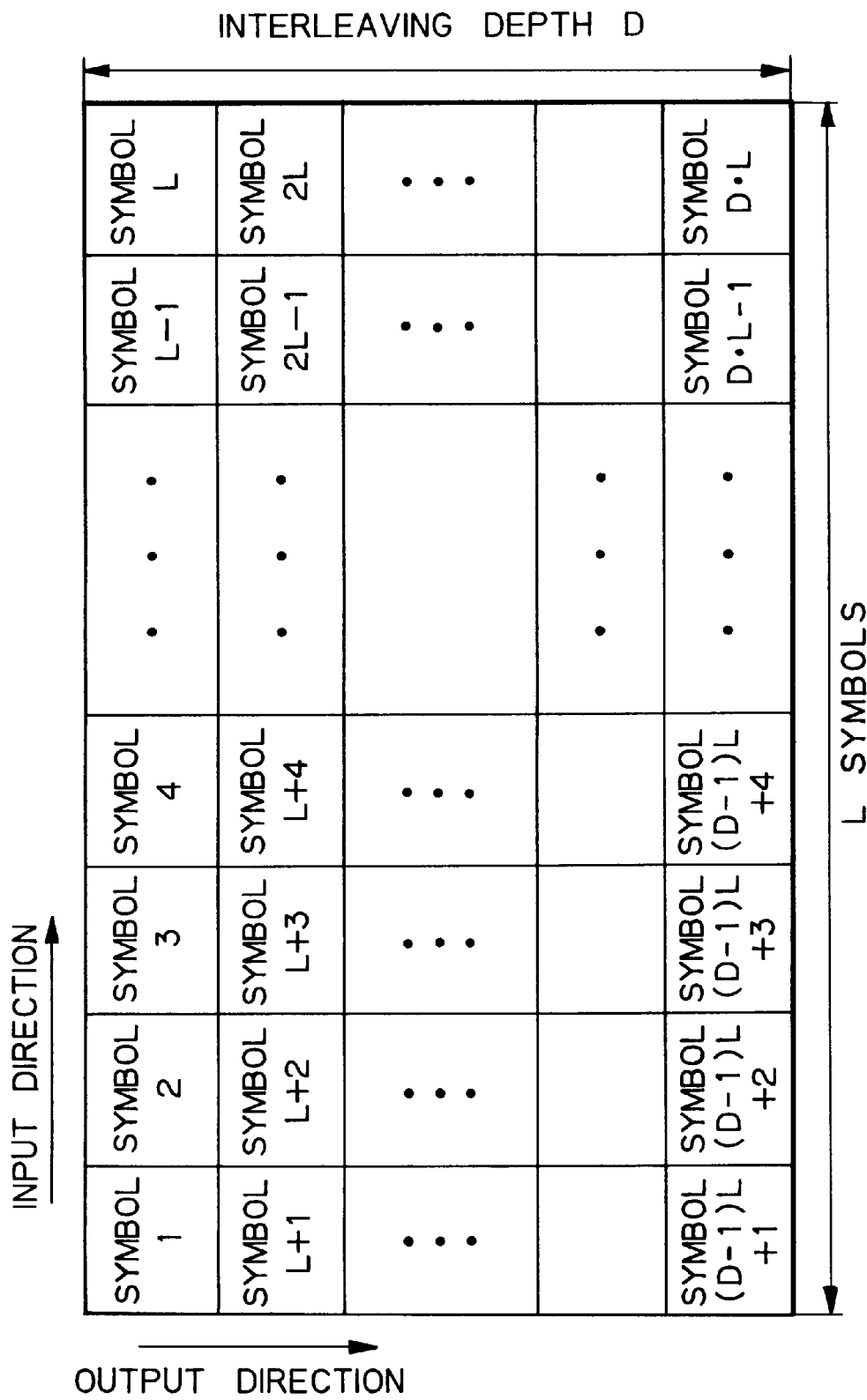
FIG. 2 illustrates an example of interleaving with respect to FEC coded data.

FIG. 2 illustrates an example of the interleaving at the interleaving unit 12. In this example, the FEC coded data are interleaved in units of symbols composed of a plurality of bits. As shown in the figure, the FEC coded data are sequentially input in the order of symbols 1, 2, 3, . . . , L, L+1, . . . , and then sequentially output to the transmitter unit 13 in the order of symbols 1, L+1, 2L+1, . . . , (D+1)·L+1, 2, L+2, . . . , (D−1)·L+2, 3, L+3, . . . , where L denotes an interleaving block length, and D denotes an interleaving depth. The interleaving is executed in unit of every L×D symbols. When using the block codes such as the BCH codes or the RS codes as the FEC codes, L may be typically selected to be equal to the block code length but can be selected to another value. As for parameters of interleaving, there are an interleaving block length and an interleaving depth. In this embodiment, at least one of these parameters can be changed in accordance with variation of the transmission path conditions, during data communication.

Although the FEC coded data are interleaved in units of symbols in this example, it is apparent that the data may be interleaved in units of bits.

The transmitter unit 13 executes known transmitting processes with respect to the output data from the interleaving unit 12, and then sends the processed signals to the receiving side device 2 via the transmission link 3. The known transmitting processes may include, for example, a process of framing for transmission, a modulation process, a process of converting frequency up to a radio frequency and an amplifying process.

The transmitted signals are received by the receiver unit 23 in the receiving side device 2 via the transmission link 3 including the radio link. Due to fading occurring during the transmission via the radio link, the level of the transmitted signal at the receiver unit 23 will greatly vary with respect to time. Also, due to delayed waves, the transmitted signal at the receiver unit 23 may be a composite signal of various signals with different delay amounts.

The receiver unit 23 executes known receiving processes with respect to the received signal via the transmission link 3, and then outputs the processed signals to the deinterleaving unit 22. The known receiving processes may include, for example, a filtering process, an amplifying process, a frequency converting process, a demodulation process and a process of data separation in a transmission frame.

Figure 3:
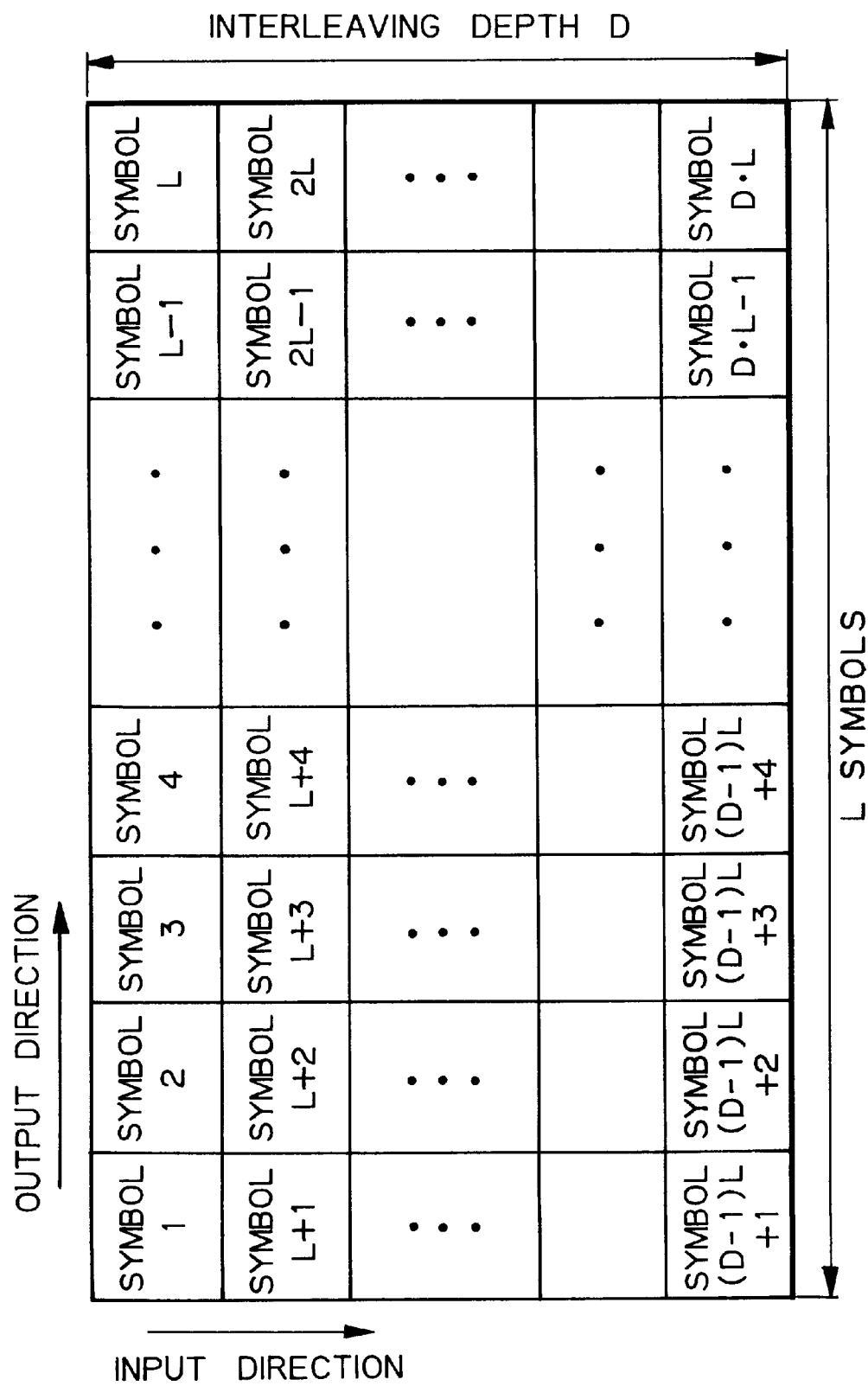
FIG. 3 illustrates an example of deinterleaving of interleaved data.

The deinterleaving unit 22 deinterleaves the data sequence from the receiver unit 23 to restore the order of the interleaved symbols or bits. If the data was interleaved in the way shown in FIG. 2, the deinterleaving will be executed as shown in FIG. 3. Namely, as shown in the figure, the data from the receiver unit 23 are sequentially input in the order of symbols 1, L+1, 2L+1, . . . , (D+1)·L+1, 2, L+2, . . . , (D−1)·L+2, 3, L+3, . . . , and then sequentially output to the FEC decoding unit 21 in the order of symbols 1, 2, 3,..., L, L+1 The FEC decoding unit 21 decodes the input data in accordance with the FEC strategy used, and outputs the FEC decoded data. In this decoding process at the FEC decoding unit 21, error relating information which will be described later is simultaneously obtained.

Additionally, in the receiving process at the receiver unit 23, information with respect to a received signal level, a received noise level and an aperture degree of the eye pattern of the received signal are simultaneously obtained.

Figure 4:
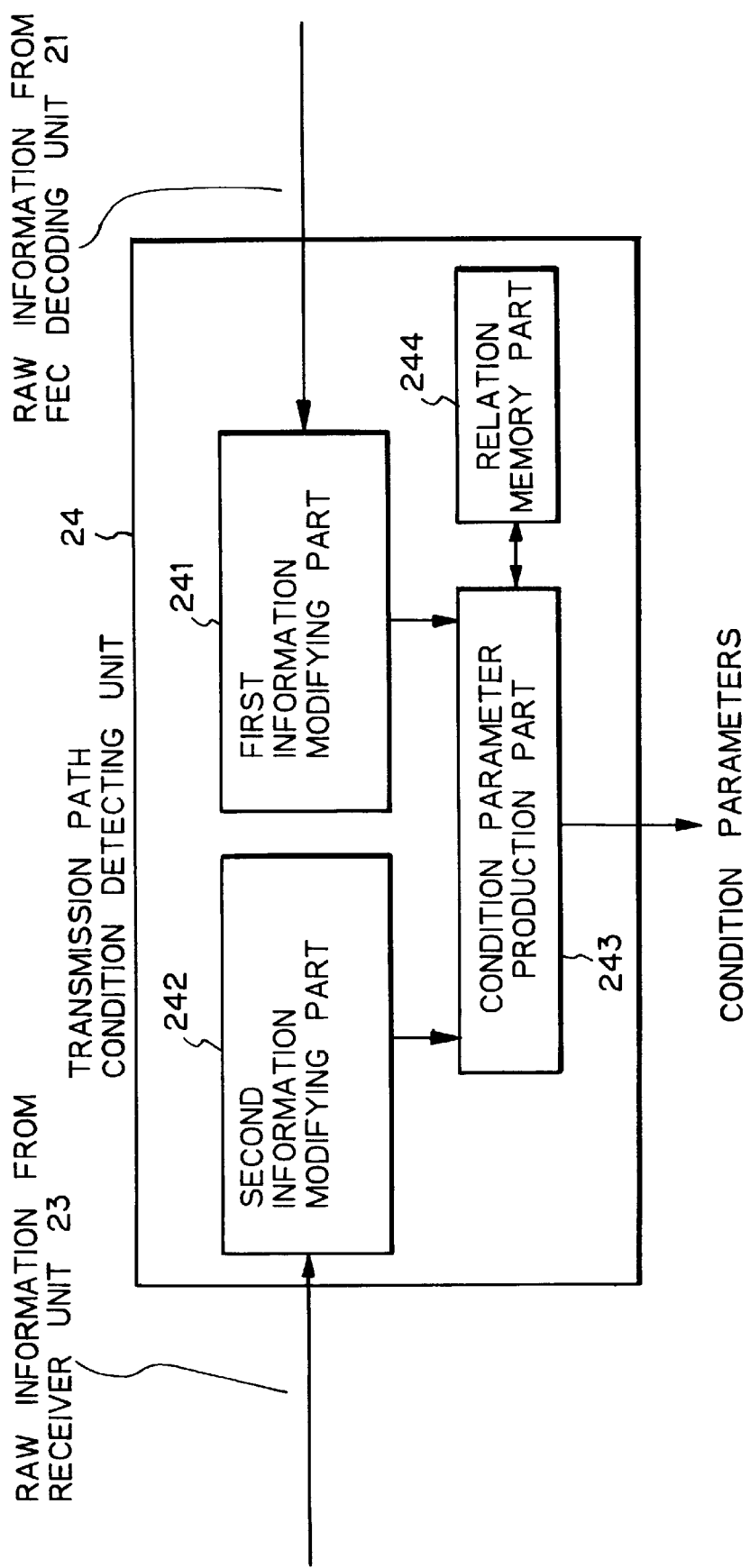
FIG. 4 is a block diagram illustrating a concrete configuration of a transmission path condition detecting unit in the embodiment of FIG. 1.

The transmission path condition detecting unit 24 receives, during the data communication, this raw information from the FEC decoding unit 21 and the receiver unit 23, and detects the conditions in the transmission link 3 through which the received signals have passed. FIG. 4 schematically illustrates a concrete configuration of this condition detecting unit 24.

As shown in the figure, the condition detecting unit 24 has a first information modifying part 241 for modifying, if necessary, the error relating information (raw information) from the FEC decoding unit 21 to produce modified information, a second information modifying part 242 for modifying, if necessary, the information (raw information) from the receiver unit 23 to produce modified information, a condition parameter production part 243 for producing condition parameters indicating the transmission path conditions, based upon the raw information and the modified information (in this description, both of the raw information and the modified information are referred to as "statistical information including transmission error information"), and a relation memory part 244 for storing a relation between the statistical information including transmission error information and the values of the respective condition parameters in a form of relational functions or a relational database.

As for error relating information (raw information) applied to the first information modifying part 241 from the FEC decoding unit 21, there are corrected bit/symbol error pulses and uncorrectable error pulses for example. The corrected bit/symbol error pulses are pulses provided from the FEC decoding unit 21 when there exists a bit or symbol (a unit of error correction) corrected by the FEC strategy. The uncorrectable error pulses are pulses provided from the FEC decoding unit 21 when the errors cannot be corrected by the FEC strategy, in other words, when errors exceeding the correctable limit occur.

The first information modifying part 241 modifies these error relating information (raw information) and outputs various modified information such as a number of errors occurred (corrections executed) per a predetermined period of time n, a fluctuation of the number of errors per a predetermined period of time Σ, a number of uncorrectable error indications per a predetermined period of time m, a burst error length and a burst error interval. The number of errors n can be obtained by counting the bit/symbol error pulses for a predetermined period of time T. The fluctuation of the number of errors Σ can be obtained from a standard deviation of K numbers of errors n calculated for a predetermined period of time K×T. The number of uncorrectable error indications m can be obtained by counting the uncorrectable error pulses for a predetermined period of time T. Supposing that errors are part of a burst when an interval between the neighbor bit/symbol errors is within a predetermined number of bits/symbols, the burst error length can be obtained from a mean value of the lengths of these burst errors. The burst error interval can be provided from the average number of bits/symbols in between a burst error and of the next burst error.

As for information (raw information) input into the second information modifying part 242 from the receiver unit 23, there are a received signal level and a noise level for example. The received signal level is information provided by measuring an intensity of the received signal at the receiver unit 23. The noise level is information provided by measuring an intensity of noise on the received signal at the receiver unit 23.

The second information modifying part 242 modifies this information (raw information) and outputs various modified information such as a mean received signal level per a predetermined period of time r, a fluctuating width of the received signal level per a predetermined period of time σ, a fluctuating period of the received signal level and a mean noise level per a predetermined period of time. The mean received signal level r can be obtained by calculating a mean value of the received signal level for a predetermined period of time t. The fluctuating width of the received signal level a can be obtained from a standard deviation of k mean received signal levels r calculated for a predetermined period of time k×t. The fluctuating period of the received signal level can be obtained by calculating, for example, a mean value of the received signal level from a time the received signal level once crosses a certain threshold level to a time the level crosses again the threshold level to the same direction. The mean noise level can be obtained by calculating a mean value of the noise level on the received signal for a predetermined period of time t.

The relation memory part 244 preliminarily stores a relation between the statistical information including transmission error information, which statistical information is composed of the raw information and the modified information, and the values of the respective condition parameters in a form of relational functions or a relational database. As for condition parameters, there are a Doppler frequency (fading rate, inverse value of fading period), a fading depth, a ratio of mean received signal level to mean noise level (mean C/N), a delay spread (varied time-delay due to reflections) and a ratio of propagation levels of line-of-sight (direct wave) to non line-of-sight (reflected wave). Under various transmission path conditions, a relation between values of these condition parameters and the statistical information including transmission error information has been previously obtained by experiments for example. Then, the relation has been stored in the relation memory part 244. If the relation can be represented by mathematical expressions or approximate expressions, the expressions are stored. Otherwise, data tables representing the relation between the condition parameter values and the statistical information including transmission error information may be stored. Table 1 indicates an example of these tables.

TABLE 1

| Information 1 (Fluctuation Period of Received Signal Level) | Information 2 (Corrected Error Number/Total Bit number per a predetermined time) | Information 3 (Burst Error Length) | Parameter 1 (Fading Period) | Parameter 2 (Delay Variance) | Parameter 3 (Propagation Level Ratio of line-of-sight and trans horizon) |
|---|---|---|---|---|---|
| 10 | 0.1 | 50 | 20 | 0.1 | 0 |
| 12 | 0.01 | 60 | 20 | 0.1 | 10 |
| 16 | 0.3 | 50 | 20 | 0.5 | 0 |
| 20 | 0.01 | 60 | 20 | 0.5 | 10 |
| 40 | 0.2 | 120 | 50 | 0.1 | 0 |
| 50 | 0.1 | 150 | 50 | 0.1 | 10 |
| 70 | 0.3 | 130 | 50 | 0.5 | 0 |
| 90 | 0.3 | 140 | 50 | 0.5 | 10 |

Referring to the relation previously stored in the memory part 244, the condition parameter production part 243 finds and outputs condition parameter values which correspond to values of the statistical information including transmission error information provided from the first and second information modifying parts 241 and 242. If the relation is represented by expressions, the condition parameter values can be directly obtained by substituting the values of the statistical information including transmission error information into the stored expressions. However, if the relation is represented by data tables, the provided statistical information including transmission error information values may not always coincide with the values described in the table. In such cases, each of condition parameter values corresponding to the table value which is the nearest to the value of the provided statistical information including transmission error information may be selected, or a plurality of condition parameter values corresponding to the table values which approximate the value of the provided statistical information including transmission error information may be first selected and then one of the selected condition parameter values may be decided by using interpolation or by majority.

There are following qualitative relations, for example, between the statistical information including transmission error information and the condition parameters.

(1) Relation between a burst error length and a burst error interval, and a Doppler frequency (fading rate, inverse value of fading period):
   Longer burst error length and burst error interval will result from lower Doppler frequency (slower fading rate).
(2) Relation between a fluctuating period of the received signal level and a Doppler frequency (fading rate, inverse value of fading period):
   Longer fluctuating period of the received signal level will result from lower Doppler frequency (slower fading rate).
(3) Relation between a fluctuating width of the received signal level and a fading depth:
   Larger fluctuating width of the received signal level will result from larger fading depth.
(4) Relation between a fluctuation of the number of errors per a predetermined period of time Σ and a fading depth:
   Larger fluctuation of the number of errors will result from larger fading depth.
(5) Relation between a mean received signal level per a predetermined period of time r and a mean noise level per a predetermined period of time, and a mean C/N:
   Mean C/N is obtained from a ratio of the mean received signal level r to the mean noise level.
(6) Relation between a number of errors per a predetermined period of time, a number of uncorrectable errors per a predetermined period of time, a mean received signal level per a predetermined period of time r and a mean noise level per a predetermined period of time, and a delay spread:

If a ratio of the mean received signal level r to the mean noise level (mean C/N) is constant, larger number of errors and number of uncorrectable errors per a predetermined period of time will result from larger delay variance.

Figure 5:
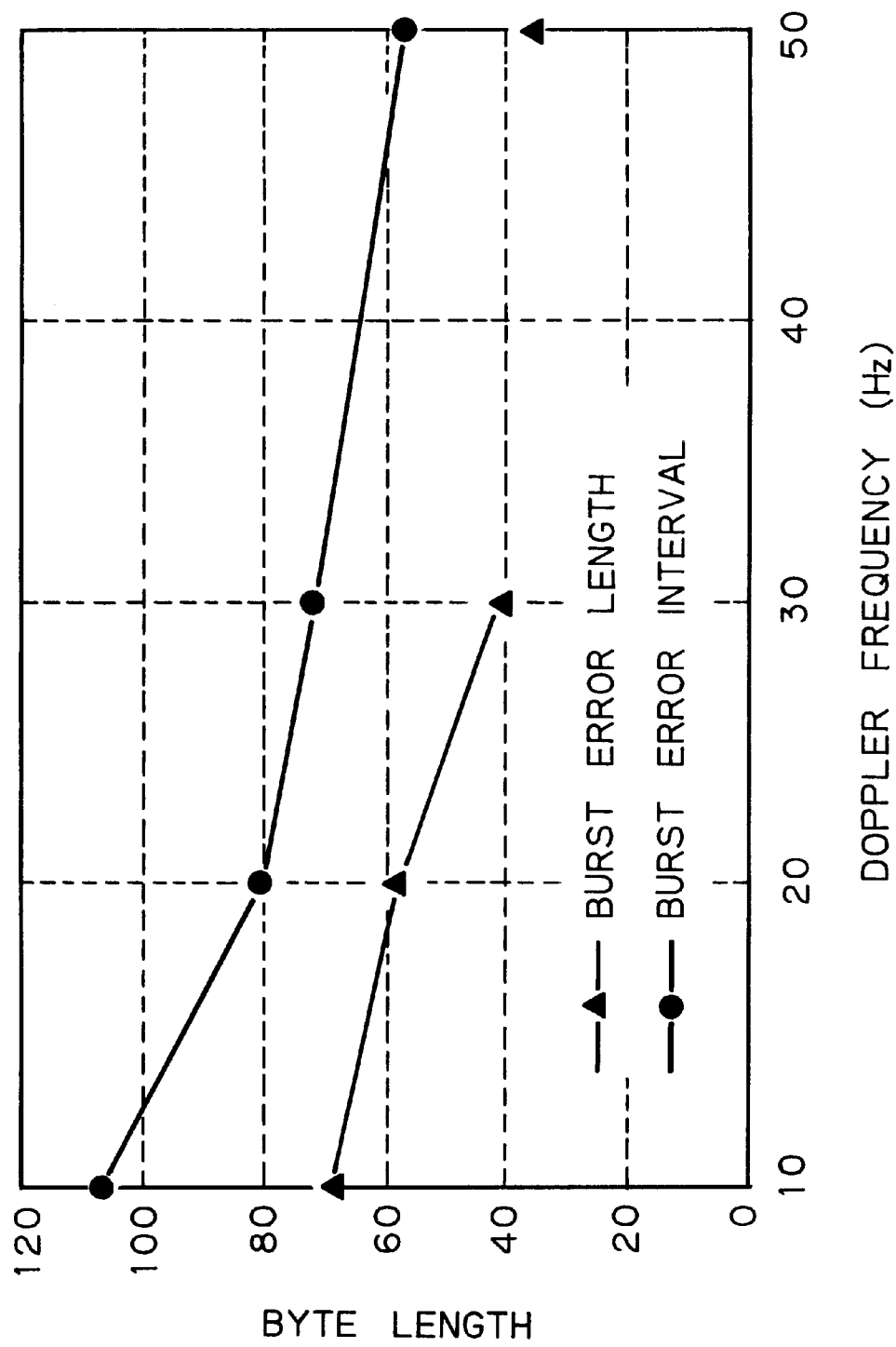
FIG. 5 is a characteristic view illustrating a certain relationship of the Doppler frequency with respect to the burst error length and the burst error interval.

By quantitatively evaluating the above-mentioned relations, relations between the statistical information including transmission error information and the condition parameters can be represented by expressions or tables. FIG. 5 illustrates characteristics indicating a relation between a burst error length and a Doppler frequency (fading rate) and a relation between a burst error interval and a Doppler frequency in PHS, where it is considered that burst error has occurred if the symbol error interval is within 20 bytes (1 symbol=1 byte, 8 bits). By using these characteristics, the Doppler frequency value can be determined from the burst error length or from the burst error interval.

Depending upon the condition parameter values applied from the transmission path condition detecting unit 24, the strategy and parameter determining unit 25 determines an optimum FEC strategy and/or interleaving parameters which determine the interleaving strategy as well as optimum values of FEC parameters for the transmission path conditions.

In this embodiment, the strategy and parameter determining unit 25 determines the strategies and/or their parameters as follows. A plurality of typical combinations of condition parameters indicating transmission path conditions (Doppler frequency (fading rate), fading depth, ratio of mean received signal level and mean noise level (mean C/N) and delay spread for example) are selected. Relations of optimum or approximately optimum FEC strategy, and also optimum FEC and interleaving parameter values with respect to various transmission path conditions represented by the selected condition parameters are preliminarily obtained, for example, by experiments. If the relation can be represented by mathematical expressions or approximate expressions, the expressions are stored. Otherwise, data tables representing the relation between the condition parameter values and optimum strategies and their parameters may be stored. Table 2 indicates an example of these tables.

TABLE 2

| Transmission Path Conditions | | | | Optimum Strategies and Parameter Values | | | |
|---|---|---|---|---|---|---|---|
| | | Parameter 3 | | FEC | | Interleaving | |
| | | (Propagation | | | | Parameter | |
| | Parameter | Level Ratio of | | | | | |
| Parameter 1 (Fading Period) | 2 (Delay Variance) | Line-of-sight and Trans Horizon) | Protocol | Parameter 1 (Code Length) | Parameter 2 (Parity Length) | 1 (Block Length) | Parameter 2 (Depth) |
| 20 | 0.1 | 0 | RS code | 200 | 10 | 200 | 20 |
| 20 | 0.1 | 10 | BCH code | 200 | 10 | 200 | 10 |
| 20 | 0.5 | 0 | RS code | 200 | 20 | 200 | 20 |
| 20 | 0.5 | 10 | BCH code | 100 | 10 | 200 | 10 |
| 50 | 0.1 | 0 | RS code | 150 | 30 | 150 | 7 |
| 50 | 0.1 | 10 | RS code | 200 | 14 | 200 | 5 |
| 50 | 0.5 | 0 | RS code | 100 | 30 | 100 | 10 |
| 50 | 0.5 | 10 | RS code | 200 | 18 | 200 | 5 |

Referring to the relations previously stored, the strategy and parameter determining unit 25 finds and outputs optimum FEC strategy, as well as optimum FEC parameter values and/or optimum interleaving parameter values which correspond to the condition parameter values provided from the transmission path condition detecting unit 24. If the relation is represented by expressions, the strategy and/or the parameter values can be directly obtained by substituting the condition parameter values into the stored expressions. However, if the relation is represented by data tables, the provided condition parameter values may not always coincide with the values described in the table. In such cases, each of strategies and/or their parameter values corresponding to the table value which is the nearest to the value of the provided condition parameter may be selected, or a plurality of strategies and/or their parameter values corresponding to the table values which approximate the provided condition parameter value may be first selected and then one of the selected strategies and/or their parameter values may be decided by using interpolation or by majority.

There are the following qualitative relations for example between the condition parameter values and the FEC strategy, the FEC parameter values and the interleaving parameter values.
(1) Relation between a Doppler frequency (fading rate, inverse value of fading period) and an interleaving length:
   Lower Doppler frequency (slower fading rate) will result in longer interleaving length (interleaving block length×interleaving depth).
(2) Relation between a mean C/N and a delay spread, and a FEC coding rate:
   Higher mean C/N will result in larger FEC coding rate, and smaller delay spread will result in larger FEC coding rate.

In this embodiment, in accordance with the statistical information including transmission error information, optimum FEC strategy as well as optimum FEC parameter values and/or optimum interleaving parameter values are finally determined. However, in a modified embodiment, it may be finally determined by the similar manner that respective values of the FEC parameters and/or the interleaving parameters should be increased or decreased.

Information with respect to the thus determined FEC strategy, FEC parameter values and/or interleaving parameter values, or to the determined increasing or decreasing direction of the FEC parameter values and/or interleaving parameter values is transmitted from the strategy and parameter determining unit 25 to the FEC coding unit 11 and the interleaving unit 12 in the sending side device 1 by means of an appropriate path as needed so as to change the error control strategy and/or the parameters during data communication. If the data communication is carried out through a bidirectional transmission link, the above-mentioned information will be transmitted via this bidirectional link. Otherwise, the information will be transmitted to the sending side device 1 via another transmission link.

In general, under a radio link environment of the mobile communication, burst bit errors (errors occurring very close together) may frequently occur due to, for example, fading. The occurring pattern of the errors depends on transmission path conditions such as a fading rate, a fading depth, a ratio of mean received signal level to mean noise level and a delay spread. Therefore, according to the embodiment of FIG. 1, condition parameters such as a fading rate, a fading depth, a ratio of mean received signal level to mean received noise level, a delay spread and a propagation level ratio of line-of-sight and non line-of-sight are obtained depending upon statistical information including transmission error information, which statistical information is composed of raw information during data communication such as a received signal level, a received noise level, corrected bit/symbol error pulses and uncorrectable error pulses. The statistical information is also composed of modified information such as a mean received signal level per a predetermined period of time r, a fluctuating width of the received signal level per a predetermined period of time $\sigma$, a fluctuating period of the received signal level, a mean noise level per a predetermined period of time, a number of errors occurred (corrections executed) per a predetermined period of time n, a fluctuation of the number of errors per a predetermined period of time $\Sigma$, a number of uncorrectable errors per a predetermined period of time m, a burst error length and a burst error interval. Then, an optimum FEC strategy, optimum FEC parameter values and/or optimum interleaving parameter values for the transmission path conditions represented by the obtained condition parameter values are determined and changed during data communication, so that the transmission efficiency is always maintained at the maximum value.

Figure 6:
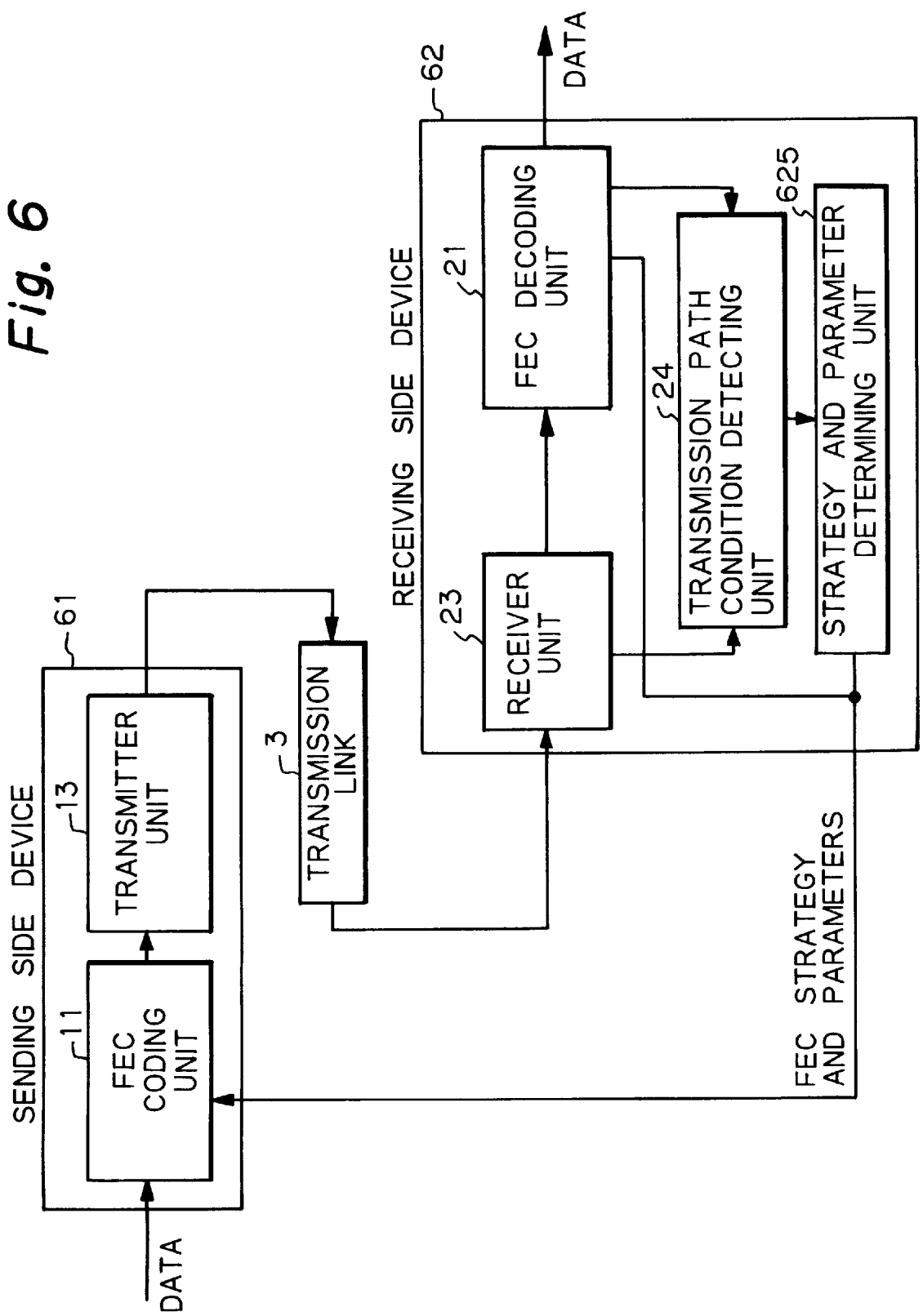
FIG. 6 is a block diagram schematically illustrating another embodiment of an error control system for data transmission over a digital mobile communication system, according to the present invention.

FIG. 6 schematically illustrates another embodiment of an error control system for data transmission over a digital mobile communication system, according to the present invention. As will be apparent from this figure, the error control system is constituted by a sending side device 61 and a receiving side device 62 connected with each other by a transmission link 3 which includes a radio path.

In the error control system of this embodiment, only a FEC strategy is executed without any interleaving strategy. Therefore, in the sending side device 61, output of the FEC coding unit 11 is directly applied to the transmitter unit 13, whereas in the receiving side device 62, output of the receiver unit 23 is directly applied to the FEC decoding unit 21. A strategy and parameter determining unit 625 in the receiving side device 62 determines only a FEC strategy and its parameters depending upon condition parameter values provided from the transmission path condition detecting unit 24. Constitution, operations and advantages of this embodiment are the same as these in the embodiment of FIG. 1 except that this embodiment does not carry out interleaving and deinterleaving operations. In this embodiment shown in FIG. 6, the similar elements as that in the embodiment of FIG. 1 are provided with the same reference numerals.

Figure 7:
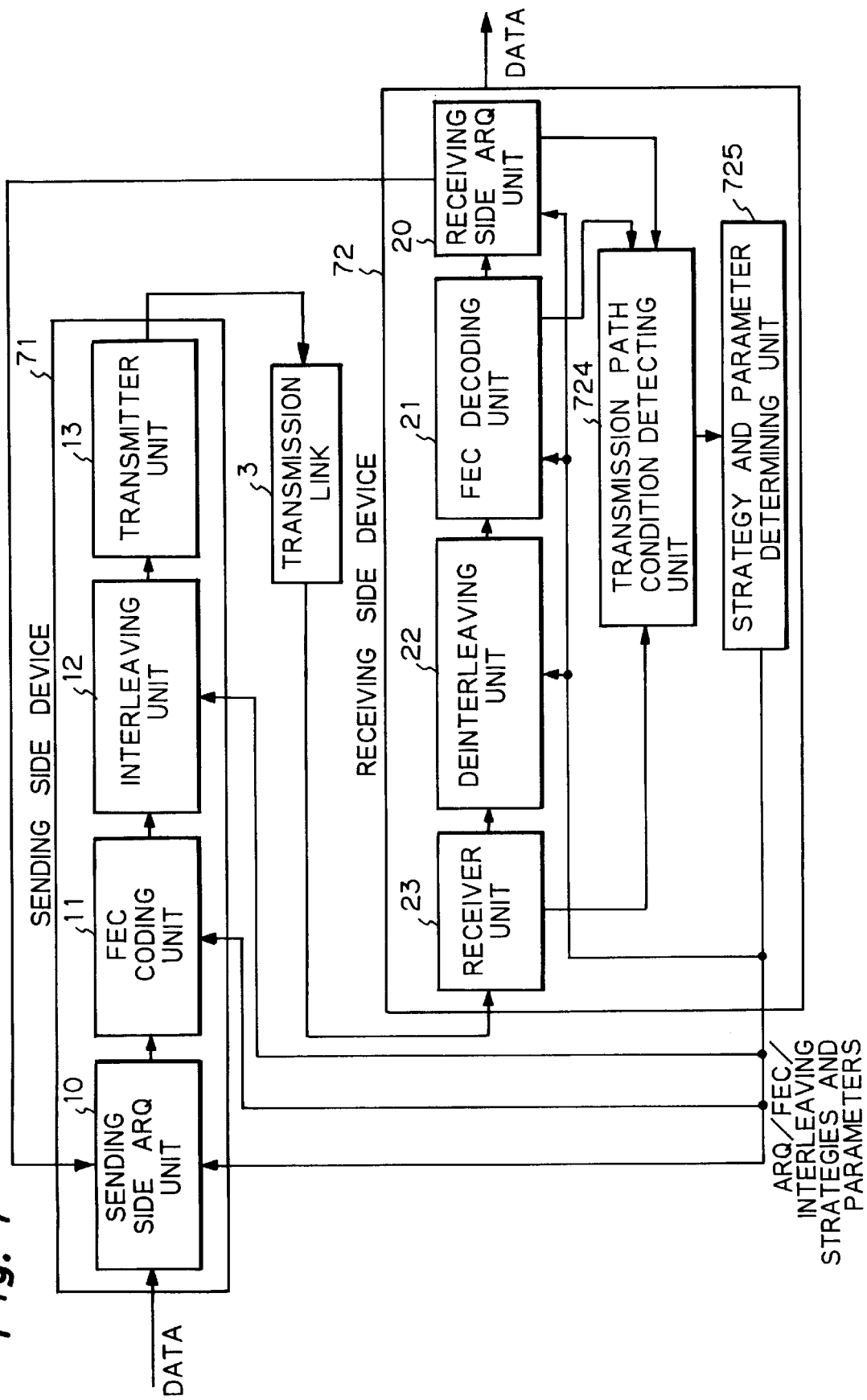
FIG. 7 is a block diagram schematically illustrating a further embodiment of an error control system for data transmission over a digital mobile communication system, according to the present invention.

FIG. 7 schematically illustrates a further embodiment of an error control system for data transmission over a digital mobile communication system, according to the present invention. As will be apparent from this figure, the error control system is constituted by a sending side device 71 and a receiving side device 72 connected with each other by a transmission link 3, which includes a radio path.

In the error control system of this embodiment, an ARQ strategy is executed in addition to the FEC strategy and the interleaving strategy. In the embodiment, the similar elements as that in the embodiment of FIG. 1 are provided with the same reference numerals.

The sending side device 71 has a sending side ARQ unit 10, the FEC coding unit 11, the interleaving unit 12 and the transmitter unit 13, whereas the receiving side device 72 has the receiver unit 23, the deinterleaving unit 22, the FEC decoding unit 21, a receiving side ARQ unit 20, a transmission path condition detecting unit 724 and a strategy and parameter determining unit 725.

The sending side ARQ unit 10 in the sending side device 71 converts the input data frame into frames which are necessary for ARQ control (ARQ frames) and outputs the converted data to the FEC coding unit 11. The ARQ frame has not only the input data but also additional information necessary for ARQ control such as a transmission frame number and a number of error detecting bits. In this embodiment, any ARQ strategy including a typical Go-Back-N type ARQ strategy, a Selective Repeat type ARQ strategy or other ARQ strategies can be used. As for parameters in the ARQ strategy, there are for example an ARQ frame length, the maximum number of error detecting bits and a modulo number for frame number. In this embodiment, the ARQ strategy and at least one of these parameters can be changed in accordance with variation of the transmission path conditions, during data communication.

Constitution and operations of the FEC coding unit 11, the interleaving unit 12 and the transmitter unit 13 in the sending side device 71 and also of the receiver unit 23, deinterleaving unit 22 and the FEC decoding unit 21 are the same as those in the case of the embodiment of FIG. 1.

In the receiving side device 72, the FEC decoded data from the FEC decoding unit 21 are applied to the receiving side ARQ unit 20. This ARQ unit 20 detects an error in accordance with the ARQ control information in the ARQ frame, and executes, depending upon whether an error exists or not, a repeat request process in accordance with the ARQ strategy used. In the case that an error is detected after decoding at the FEC decoding unit 21, it is unnecessary for the ARQ unit 20 to detect an error. In such a case, the ARQ unit 20 can utilize the error information provided from the FEC decoding unit 21 without executing error detection.

In accordance with the ARQ strategy, information needed for ARQ control (backward ARQ control information) will be returned from the receiving side ARQ unit 20 to the sending side ARQ unit 10 by means of a return path. If the data communication is carried out through a bidirectional transmission link, the above-mentioned backward control information will be returned via this bidirectional link. Otherwise, the information will be returned to the sending side ARQ unit 10 via another transmission link.

In the ARQ receiving process at the receiving side ARQ unit 20, error relating information of the ARQ frame is simultaneously obtained. This obtained information is applied to the transmission path condition detecting unit 724. Thus, the condition detecting unit 724 detects, in a manner similar to that of the condition detecting unit 24 in the embodiment of FIG. 1, the conditions in the transmission link 3 through which the received signals have passed by using the statistical information including transmission error information, which statistical information contains the ARQ frame information (raw information) and its modified information, and outputs the condition parameter values.

Depending upon the condition parameter values applied from the condition detecting unit 724, the strategy and parameter determining unit 725 determines an optimum FEC strategy and/or an optimum ARQ strategy as well as optimum values of FEC parameters, of interleaving parameters and/or of ARQ parameters at that transmission path conditions, in a manner similar to that of the strategy and parameter determining unit 25 in the embodiment of FIG. 1.

It is desired to have following qualitative relations between the condition parameter values and the FEC strategy, the ARQ strategy, as well as values of FEC parameters, of interleaving parameters and of ARQ parameters.

(1) Relation between a Doppler frequency (fading rate, inverse value of fading period) and an interleaving length:
  Lower Doppler frequency (slower fading rate) will result in longer interleaving length (interleaving block length×interleaving depth).
(2) Relation between a fading depth, a mean C/N and a delay variance, and ARQ control:
  When the mean C/N is large, the fading depth is small and the delay spread is small, no ARQ control should be executed.
(3) Relation between a mean C/N and a delay spread, and a FEC coding rate:
  Higher mean C/N will result in larger FEC coding rate, and smaller delay spread will result in larger FEC coding rate.

Similar to the modification of the embodiment of FIG. 1, optimum FEC, interleaving and/or ARQ strategies, and optimum values of FEC parameters, and/or ARQ parameters may be directly determined in accordance with the statistical information including transmission error information.

Also, similar to the modification of the embodiment of FIG. 1, whether respective values of the FEC parameters, the interleaving parameters and/or the ARQ parameters should be increased or decreased can be finally determined in accordance with the statistical information including transmission error information.

Information with respect to thus determined FEC strategy, ARQ strategy, FEC parameter values, interleaving parameter values and/or ARQ parameter values, or to the determined increasing or decreasing direction of the FEC parameter values, interleaving parameter values and/or ARQ parameter values is transmitted from the strategy and parameter determining unit 725 to the sending side ARQ unit 10, the FEC coding unit 11 and the interleaving unit 12 in the sending side device 71 by means of an appropriate path so as to change the error control strategy and/or the parameters during data communication. If the data communication is carried out through a bidirectional transmission link, the above-mentioned information will be transmitted via this bidirectional link. Otherwise, the information will be transmitted to the sending side device 71 via another transmission link.

Figure 8:
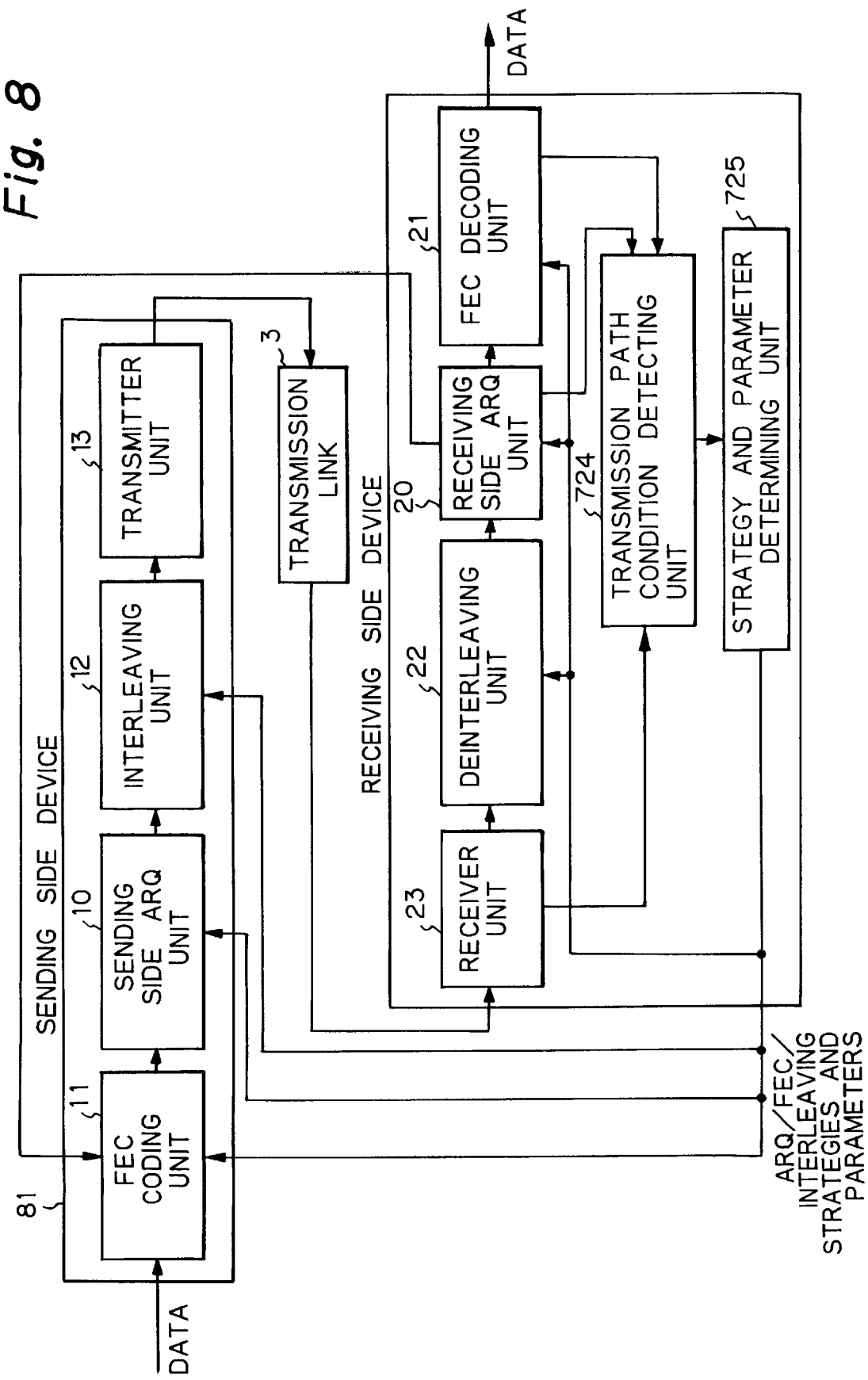
FIG. 8 is a block diagram schematically illustrating yet another embodiment of an error control system for data transmission over a digital mobile communication system, according to the present invention.

FIG. 8 schematically illustrates yet another embodiment of an error control system for data transmission over a digital mobile communication system, according to the present invention. As will be apparent from this figure, the error control system is constituted by a sending side device 81 and a receiving side device 82 connected with each other by a transmission link 3 which includes a radio path.

In the error control system of the embodiment of FIG. 7, the FEC coding is executed next to the ARQ conversion. In contrast to this, in the embodiment of FIG. 8, the ARQ conversion follows the FEC coding. Therefore, in the sending side device 81, the ARQ unit 10 is positioned between the FEC coding unit 11 and the interleaving unit 12, whereas in the receiving side device 82, the ARQ unit 20 is positioned between the deinterleaving unit 22 and the FEC decoding unit 21. Constitution, operations and advantages of this embodiment are the same as these in the embodiment of FIG. 7 except that the order of ARQ and FEC is reversed. In this embodiment shown in FIG. 8, the similar elements as that in the embodiment of FIG. 7 are provided with the same reference numerals.

FIG. 9 schematically illustrates another embodiment of an error control system for data transmission over a digital mobile communication system, according to the present invention. As will be apparent from this figure, the error control system is constituted by a sending side device 91 and a receiving side device 92 connected with each other by a transmission link 3 which includes a radio path.

In the error control system of this embodiment, only an ARQ strategy is executed without accompanying any FEC and interleaving strategies. Therefore, in the sending side device 91, output of the ARQ unit 10 is directly applied to the transmitter unit 13, whereas in the receiving side device 62, output of the receiver unit 23 is directly applied to the ARQ unit 20. A transmission path condition detecting unit 924 detects transmission path conditions in accordance with error relating information provided from the receiving side ARQ unit 20 and information provided from the receiver unit 23 as well as in accordance with the modified information thereof, and outputs condition parameter values. A strategy and parameter determining unit 925 in the receiving side device 92 determines only an ARQ strategy and/or its parameters depending upon the condition parameter values provided from the transmission path condition detecting unit 924. Constitution, operations and advantages of this embodiment are the same as those in the embodiment of FIG. 7 except that this embodiment does not carry out FEC, interleaving and deinterleaving operations. In the embodiment shown in FIG. 9, elements similar to those in the embodiment of FIG. 7 are provided with the same reference numerals.

Figure 10B:
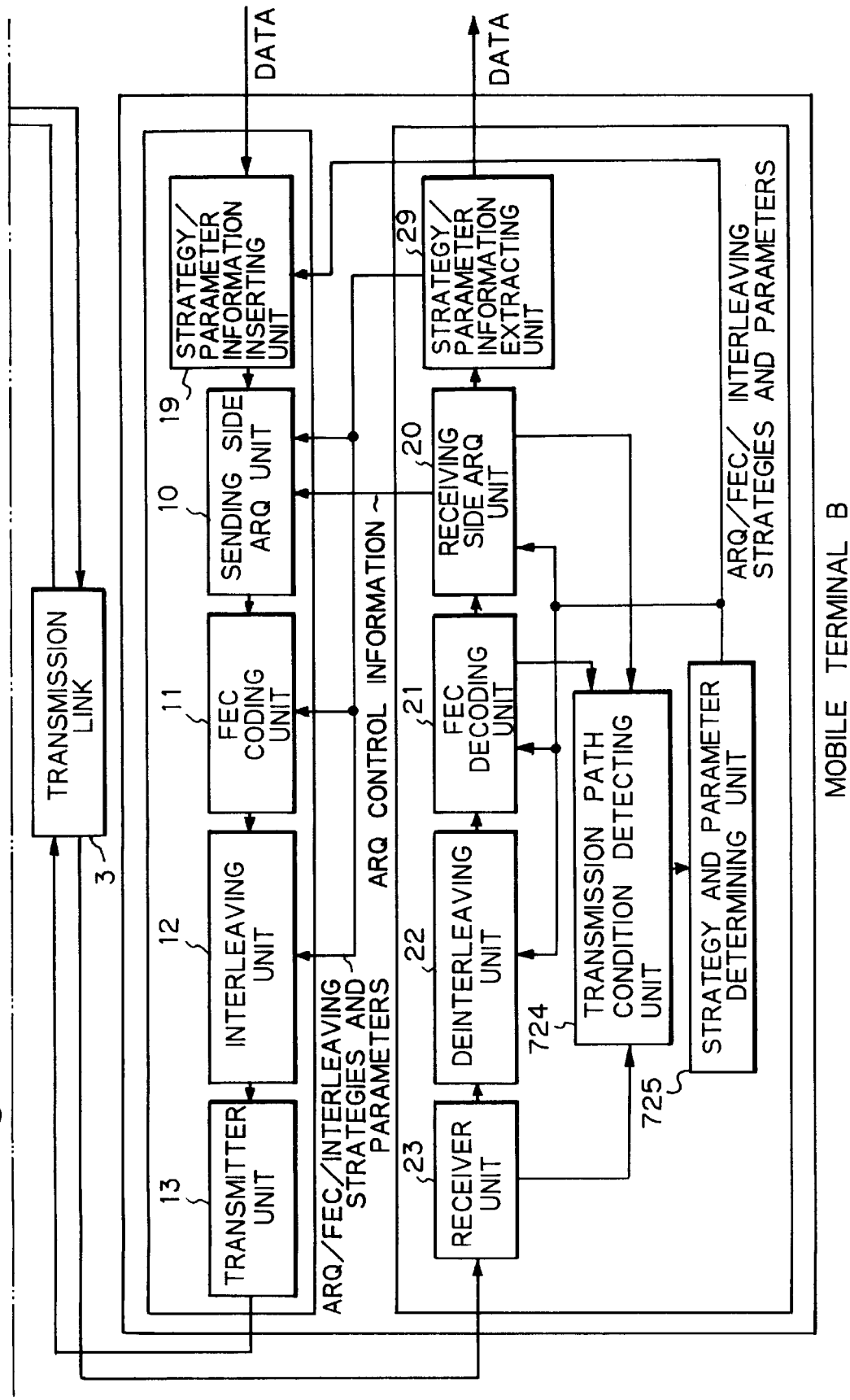

FIG. 10 schematically illustrates a further embodiment of an error control system for data transmission over a digital mobile communication system, according to the present invention. In this embodiment, mobile terminals A and B, each of which has both a sending side device and a receiving side device and can be used for bidirectional data communication, have the same constitution as each other and are connected via the transmission link 3. In the figure, the same reference numerals are given for elements similar to those in the embodiment of FIG. 7.

In this embodiment, information with respect to FEC strategy, ARQ strategy, FEC parameter values, interleaving parameter values and/or ARQ parameter values, or to increasing or decreasing direction of the FEC parameter values, interleaving parameter values and/or ARQ parameter values can be transmitted from the receiving side to the sending side via the bidirectional transmission link. In practice, the information of the strategy and/or its parameters determined at the strategy and parameter determining unit 725 is inserted into output data to be transmitted at a strategy/parameter information inserting unit 19 in one mobile terminal for example B. Therefore, the information of the strategy and/or its parameters is sent to the other mobile terminal A via the link 3. In the mobile terminal A, the transmitted information of the strategy and/or its parameters are/is extracted at a strategy/parameter information extracting unit 29 and the extracted information are applied to the ARQ unit 10, the FEC coding unit 11 and the interleaving unit 12 so as to change the strategy and/or its parameters. On the other hand, the ARQ control information produced at the receiving side ARQ unit 20 in the mobile terminal B are inserted at the sending side ARQ unit 10 in this mobile terminal B, and transmitted to the mobile terminal A via the bidirectional transmission link 3. Constitution, operations and advantages of this embodiment are the same as these in the embodiment of FIG. 7 except that this embodiment carries out bidirectional data transmission.

FIG. 11 schematically illustrates a further embodiment of an error control system for data transmission over a digital mobile communication system, according to the present invention. In the aforementioned embodiments, condition parameters are obtained depending upon statistical information including transmission error information, and then an optimum error control strategy and/or optimum parameter values for the transmission path conditions represented by the obtained condition parameter values are/is determined. However, in this embodiment, an optimum FEC strategy, optimum FEC parameter values and/or optimum interleaving parameter values are directly determined in accordance with the statistical information including transmission error information. Namely, relations of optimum strategies and/or their parameter values with respect to the statistical information including transmission error information are preliminarily obtained from the relations between the statistical information including transmission error information and the condition parameters and from the relations between the condition parameters and optimum strategies and/or their parameter values. The obtained relations are preliminarily stored in a strategy and parameter determining unit 1125 in a receiving side device 112 shown in FIG. 11. If the relation can be represented by mathematical expressions or approximate expressions, the expressions are stored. Otherwise, data tables representing the relation between the statistical information including transmission error information and optimum strategies and/or their parameters may be stored. Table 3 indicates an example of these tables.

TABLE 3

| Statistical Information Including Transmission Error Information | | | Optimum Strategies and Parameter Values | | | | |
|---|---|---|---|---|---|---|---|
| | Information 2 (Corrected Error Number/ Total Bit Number) | | | | | | |
| Information 1 | | | | FEC | | Interleaving | |
| (Fluctuating Period of Received Signal Level) | Para (Predetermined time) Variance) | Information 3 (Burst Error Length) | Protocol | Parameter 1 (Code Length) | Parameter 2 (Parity Length) | Parameter 1 (Block Length) | Parameter 2 (Depth) |
| 10 | 0.1 | 50 | RS code | 200 | 10 | 200 | 20 |
| 12 | 0.01 | 60 | BCH code | 200 | 10 | 200 | 10 |
| 16 | 0.3 | 50 | RS code | 200 | 20 | 200 | 20 |
| 20 | 0.01 | 60 | BCH code | 100 | 10 | 200 | 10 |
| 40 | 0.2 | 120 | RS code | 150 | 30 | 150 | 7 |
| 50 | 0.1 | 150 | RS code | 200 | 14 | 200 | 5 |
| 70 | 0.3 | 130 | RS code | 100 | 30 | 100 | 10 |
| 90 | 0.3 | 140 | RS code | 200 | 18 | 200 | 5 |

By reference to the stored relations, the strategy and parameter determining unit 1125 determines an optimum FEC strategy, optimum FEC parameter values and/or optimum interleaving parameter values are directly determined in accordance with the statistical information including transmission error information. Constitution, operations and advantages of this embodiment are the same as these in the embodiment of FIG. 1 except that this embodiment directly obtains the error control strategy and/ or parameter values from the statistical information. In FIG. 11, elements similar to those in the embodiment of FIG. 1 are provided with the same reference numerals.

According to the aforementioned embodiments of the present invention, a throughput of 0.5 or more can be achieved by determining an optimum error control strategy accompanied with the RS codes and/or optimum strategy parameters even under transmission path conditions of Rayleigh fading environment wherein the C/N ratio is about 10 dB. If the communication is executed near the base station, a higher throughput close to 1.0 can be attained by determining an optimum error control strategy and/or optimum strategy parameters.

Many widely different embodiments of the present invention may be constructed without departing from the spirit and scope of the present invention. It should be understood that the present invention is not limited to the specific embodiments described in the specification, except as defined in the appended claims.

What is claimed is:

1. An error control method for wireless data transmission over a digital mobile communication system, comprising the steps of:

obtaining, during data communication, statistical information including transmission error information at a receiving side;

determining an error control strategy and/or a value of at least one parameter of said error control strategy which are/is optimum for transmission path conditions at that time, based upon the obtained statistical information; and using the determined error control strategy and/or the at least one parameter for the error control during data communication, wherein said determining step includes a first selection step of selecting values of condition parameters which represent conditions of a wireless transmission link, based upon said obtained statistical information, by reference to a preliminarily determined relation between the statistical information and the condition parameter values, and a step of determining the error control strategy and/or the at least one parameter of said error control strategy based upon the selected condition parameter values, and wherein said condition parameters include at least one of a fading rate, a fading depth, a ratio of mean received signal level to mean received noise level and a delay spread in the wireless transmission link.

2. The method as claimed in claim 1, wherein said determining step includes a second selection step of selecting an error control strategy and/or at least one parameter of said error control strategy which are/is optimum for transmission path conditions at that time, based upon said selected condition parameter values, by reference to a preliminarily determined relation between the condition parameter values and the error control strategy and/or the at least one parameter of said error control strategy.

3. The method as claimed in claim 1, wherein said determining step includes a step of selecting an error control strategy and/or at least one parameter of said error control strategy which are/is optimum for transmission path conditions at that time, based upon said obtained statistical information, by reference to a preliminarily determined relation between the statistical information and the error control strategy and/or the at least one parameter of said error control strategy.

4. The method as claimed in claim 1, wherein said error control strategy includes a FEC strategy.

5. The method as claimed in claim 4, wherein FEC codes used in said FEC strategy are Reed Solomon codes.

6. The method as claimed in claim 1, wherein said error control strategy includes an interleaving strategy.

7. The method as claimed in claim 1, wherein said error control strategy includes an ARQ strategy.

8. An error control apparatus for wireless data transmission over a digital mobile communication system, comprising:

a statistical information extraction means for obtaining, during data communication, statistical information including transmission error information at a receiving side;

a determination means for determining an error control strategy and/or a value of at least one parameter of said error control strategy which are/is optimum for transmission path conditions at that time, based upon the obtained statistical information; and means for using the determined error control strategy and/or the at least one parameter for the error control during data communication, wherein said determination means includes a first memory means for storing a preliminarily determined relation between the statistical information and values of condition parameters which represent conditions of a wireless transmission link, a first selection means for selecting condition parameter values based upon said obtained statistical information, by reference to the relation stored in said first memory means, and means for determining the error control strategy and/or the at least one parameter of said error control strategy based upon the selected condition parameter values.

9. The apparatus as claimed in claim 8, wherein said determination means includes a second memory means for storing a preliminarily determined relation between the condition parameter values and the error control strategy and/or the at least one parameter of said error control strategy, and a second selection means for selecting an error control strategy and/or at least one parameter of said error control strategy which are/is optimum for transmission path conditions at that time, based upon said selected condition parameter values, by reference to said relation stored in said second memory means.

10. The apparatus as claimed in claim 8, wherein said condition parameters include at least one of a fading rate, a fading depth, a ratio of mean received signal level to mean received noise level and a delay spread in the wireless transmission link.

11. The apparatus as claimed in claim 8, wherein said determination means includes a memory means for storing a preliminarily determined relation between the statistical information and the error control strategy and/or the at least one parameter of said error control strategy, and means for selecting an error control strategy and/or at least one parameter of said error control strategy which are/is optimum for transmission path conditions at that time, based upon said obtained statistical information, by reference to said relation stored in said memory means.

12. The apparatus as claimed in claim 8, wherein said error control strategy includes a FEC strategy.

13. The apparatus as claimed in claim 12, wherein FEC codes used in said FEC strategy are Reed Solomon codes.

14. The apparatus as claimed in claim 8, wherein said error control strategy includes an interleaving strategy.

15. The apparatus as claimed in claim 8, wherein said error control strategy includes an ARQ strategy.

16. A data transmission system comprising a sending side device and a receiving side device which include at least one pair of the error control apparatuses claimed in claim 8, and a bidirectional transmission link for connecting said sending side device and said receiving side device.

17. An error control method for wireless data transmission over a digital mobile communication system, comprising the steps of:
    obtaining, during data communication, statistical information including transmission error information at a receiving side;
    determining an error control strategy and/or a value of at least one parameter of said error control strategy which are/is optimum for transmission path conditions at that time, based upon the obtained statistical information; and
    using the determined error control strategy and/or the at least one parameter for the error control during data communication,
    wherein the statistical information includes at least one of a received signal level, a received noise level, information indicating uncorrectable error, a fluctuation of the number of errors per a predetermined period of time, a number of uncorrectable error indications per a predetermined period of time, a burst error length, a burst error interval, a mean received signal level per a predetermined period of time, a fluctuating width of the received signal level per a predetermined period of time, a fluctuating period of the received signal level, and a mean noise level per a predetermined period of time, wherein said determining step includes a first selection step of selecting values of condition parameters which represent conditions of a wireless transmission link, based upon said obtained statistical information, by reference to a preliminarily determined relation between the statistical information and the condition parameter values, and a step of determining the error control strategy and/or the at least one parameter of said error control strategy based upon the selected condition parameter values, and wherein said condition parameters include at least one of a fading rate, a fading depth, a ratio of mean received signal level to mean received noise level and a delay spread in the wireless transmission link.

18. The method as claimed in claim 17, wherein said determining step includes a second selection step of selecting an error control strategy and/or at least one parameter of said error control strategy which are/is optimum for transmission path conditions at that time, based upon said selected condition parameter values, by reference to a preliminarily determined relation between the condition parameter values and the error control strategy and/or the at least one parameter of said error control strategy.

19. The method as claimed in claim 17, wherein said determining step includes a step of selecting an error control strategy and/or at least one parameter of said error control strategy which are/is optimum for transmission path conditions at that time, based upon said obtained statistical information, by reference to a preliminarily determined relation between the statistical information and the error control strategy and/or the at least one parameter of said error control strategy.

20. The method as claimed in claim 17, wherein said error control strategy includes a FEC strategy.

21. The method as claimed in claim 20, wherein FEC codes used in said FEC strategy are Reed Solomon codes.

22. The method as claimed in claim 17, wherein said error control strategy includes an interleaving strategy.

23. The method as claimed in claim 17, wherein said error control strategy includes an ARQ strategy.

24. An error control apparatus for wireless data transmission over a digital mobile communication system, comprising:
    a statistical information extraction means for obtaining, during data communication, statistical information including transmission error information at a receiving side;
    a determination means for determining an error control strategy and/or a value of at least one parameter of said error control strategy which are/is optimum for transmission path conditions at that time, based upon the obtained statistical information; and
    means for using the determined error control strategy and/or the at least one parameter for the error control during data communication, wherein the statistical information includes at least one of a received signal level, a received noise level, information indicating uncorrectable error, a fluctuation of the number of errors per a predetermined period of time, a number of uncorrectable error indications per a predetermined period of time, a burst error length, a burst error interval, a mean received signal level per a predetermined period of time, a fluctuating width of the received signal level per a predetermined period of time, a fluctuating width of the received signal level per a predetermined period of time, a fluctuating period of the received signal level, and a mean noise level per a predetermined period of time,
    wherein said determination means includes a first memory means for storing a preliminarily determined relation between the statistical information and values of condition parameters which represent conditions of a wireless transmission link, a first selection means for selecting condition parameter values based upon said obtained statistical information, by reference to the relation stored in said first memory means, and means for determining the error control strategy and/or the at least one parameter of said error control strategy based upon the selected condition parameter values.

25. The apparatus as claimed in claim 24, wherein said determination means includes a second memory means for storing a preliminarily determined relation between the condition parameter values and the error control strategy and/or the at least one parameter of said error control strategy, and a second selection means for selecting an error control strategy and/or at least one parameter of said error control strategy which are/is optimum for transmission path conditions at that time, based upon said selected condition parameter values, by reference to said relation stored in said second memory means.

26. The apparatus as claimed in claim 24, wherein said condition parameters include at least one of a fading rate, a fading depth, a ratio of mean received signal level to mean received noise level and a delay spread in the wireless transmission link.

27. The apparatus as claimed in claim 24, wherein said determination means includes a memory means for storing a preliminarily determined relation between the statistical information and the error control strategy and/or the at least one parameter of said error control strategy, and means for selecting an error control strategy and/or at least one parameter of said error control strategy which are/is optimum for transmission path conditions at that time, based upon said obtained statistical information, by reference to said relation stored in said memory means.

28. The apparatus as claimed in claim 24, wherein said error control strategy includes a FEC strategy.

29. The apparatus as claimed in claim 28, wherein FEC codes used in said FEC strategy are Reed Solomon codes.

30. The apparatus as claimed in claim 24, wherein said error control strategy includes an interleaving strategy.

31. The apparatus as claimed in claim 24, wherein said error control strategy includes an ARQ strategy.

32. A data transmission system comprising a sending side device and a receiving side device which include at least one pair of the error control apparatuses claimed in claim 24, and a bidirectional transmission link for connecting said sending side device and said receiving side device.

* * * * *